United States Patent
Kawashita et al.

(10) Patent No.: US 9,703,315 B2
(45) Date of Patent: Jul. 11, 2017

(54) TRANSMISSION DEVICE AND TIME SYNCHRONIZATION METHOD

(71) Applicants: FUJITSU LIMITED, Kawasaki-shi, Kanagawa (JP); FUJITSU TELECOM NETWORKS LIMITED, Kawasaki-shi, Kanagawa (JP)

(72) Inventors: Mitsuya Kawashita, Kawanishi (JP); Shota Mori, Kanagawa (JP); Kazuhiro Kunimatsu, Kanagawa (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/848,556

(22) Filed: Sep. 9, 2015

(65) Prior Publication Data
US 2016/0109900 A1    Apr. 21, 2016

(30) Foreign Application Priority Data
Oct. 16, 2014    (JP) ................................. 2014-211922

(51) Int. Cl.
  *G06F 1/12*    (2006.01)
  *H04L 1/00*    (2006.01)
  *H04J 3/06*    (2006.01)

(52) U.S. Cl.
  CPC ..................... *G06F 1/12* (2013.01)

(58) Field of Classification Search
  CPC .......................................................... G06F 1/12
  USPC .......................................................... 713/400
  See application file for complete search history.

(56) References Cited

U.S. PATENT DOCUMENTS

| 5,400,332 A | 3/1995 | Imai | |
| 7,995,463 B2* | 8/2011 | Honma | H04J 3/14 370/217 |
| 8,249,115 B2* | 8/2012 | Inomata | G04G 5/00 370/503 |
| 2005/0176425 A1* | 8/2005 | Kawakami | H04L 67/306 455/432.3 |
| 2013/0142198 A1* | 6/2013 | Atsumi | H04L 49/00 370/389 |
| 2016/0182217 A1* | 6/2016 | Hashizume | H04B 17/364 375/354 |

FOREIGN PATENT DOCUMENTS

| JP | 5-300113 | 11/1993 |
| JP | 2005-303761 | 10/2005 |

\* cited by examiner

*Primary Examiner* — Suresh Suryawanshi

(57) ABSTRACT

A transmission device includes a control card and a plurality of IF cards. The control card receives first set time from a host PC and calculates second set time by adding add time corresponding to one cycle of a clock signal that is commonly used by the control card and the IF cards to the first set time. The control card distributes the second set time to each of the IF cards. After each of the IF cards receives the second set time and sets the second set time in an internal timer, when a clock signal is detected, each of the IF cards starts a time measuring operation of the internal timer from the second set time.

4 Claims, 9 Drawing Sheets

TRANSMISSION DEVICE AND TIME SYNCHRONIZATION METHOD

CROSS-REFERENCE TO RELATED APPLICATION

This application is based upon and claims the benefit of priority of the prior Japanese Patent Application No. 2014-211922, filed on Oct. 16, 2014, the entire contents of which are incorporated herein by reference.

FIELD

The embodiments discussed herein are directed to a transmission device and a time synchronization method.

BACKGROUND

For example, there are transmission devices on which a plurality of communication cards are mounted and that transmit communication signals via each of the communication card. FIG. 8 is a diagram illustrating an example of a transmission device. A transmission device 100 illustrated in FIG. 8 has mounted thereon a plurality of interface (IF) card 110 and a control card 120 that controls each of the IF cards 110. Each of the IF cards 110 is, for example, a card that manages communication interfaces with a transmission network. The transmission device 100 has mounted thereon, for example, five IF cards 110 indicated by #1 to #5. Each of the IF cards 110 contains therein a central processing unit (CPU) 110A that controls the corresponding IF card 110 itself. Furthermore, the control card 120 contains therein a CPU 120A that controls the control card 120 itself. The transmission device 100 connects with a host PC 130 that controls the transmission device 100 and acquires time information or setting information from the host PC 130.

The control card 120 in the transmission device 100 acquires set time information that includes therein set time from the host PC 130 at a periodical time zone, for example, once a day; sets, in an internal timer that is used as a clock of its own card, the set time included in the acquired set time information; and reflects the set time. Namely, the CPU 120A in the control card 120 sets the set time in the internal timer and starts, from the set time, a time measuring operation of the internal timer. Furthermore, the control card 120 distributes the set time information acquired from the host PC 130 to each of the IF cards 110 in the transmission device 100 by using multicast transmission.

Each of the IF cards 110 sets, in the internal timer that is used as a clock of its own card, the set time included in the set time information received from the control card 120 and reflects the set time. Namely, each of the CPUs 110A in the corresponding IF cards 110 sets the set time in the corresponding internal timer and starts a time measuring operation of the corresponding internal timer from the set time. Consequently, by setting the set time included in the set time information acquired from the host PC 130 in the internal timers in the control card 120 and the IF cards 110 and by reflecting the set time, the transmission device 100 ensures synchronization of measured time among CPUs 110A (120A) in the cards.

Patent Document 1: Japanese Laid-open Patent Publication No. 05-300113

Patent Document 2: Japanese Laid-open Patent Publication No. 2005-303761

However, as illustrated in FIG. 9, processing loads of the CPUs 110A in the IF cards 110 in the transmission device 100 differ depending on specifications of the CPUs 110A themselves or the content of the processes performed by the CPUs 110A. Accordingly, even when each of the CPUs 110A in the corresponding IF cards 110 receives set time information from the control card 120, there may be a case in which, depending on a processing state, the CPU 110A is not able to immediately set the set time included in the received set time information in the internal timer and reflect the set time. Namely, in the CPU 110A in each of the IF cards 110, because there is a variation in the time period for which the set time included in the set time information is reflected to the internal timer, an error occurs in the measured time in the subject internal timer within the range between, for example, few millisecond and one second.

Furthermore, the CPU 110A in each of the IF cards 110 receives set time information received from the control card 120; however, as illustrated in FIG. 9, the reception timing of the set time information differs in accordance with a traffic state of the communication path. Accordingly, in the CPU 110A in each of the IF cards 110, because there is a variation, depending on the reception timing of the set time information, in the time period for which the set time included in the received set time information is reflected to the internal timer, an error occurs in the measured time of the subject internal timer.

Furthermore, when the CPU 110A in each of the IF cards 110 detects a failure, the CPU 110A in each of the IF cards 110 has a function of notifying the control card 120 of the failure content and the occurrence time of that failure. At this time, the CPU 110A in each of the IF cards 110 acquires the occurrence time of the failure by using the measured time of the internal timer.

However, because an error is present in the measured time of the internal timer among the IF cards 110 in the transmission device 100, when the occurrence time of the failure is collected from each of the IF cards 110, the control card 120 is not able to identify the accurate occurrence time of the failure.

SUMMARY

According to an aspect of an embodiment, a transmission device includes a first unit; and a plurality of second units. The first unit includes a creating unit and a distributing unit. The creating unit creates second set time after a predetermined time has elapsed from first set time. The distributing unit distributes the created second set time to each of the second units. Each of the second units includes a clock unit that starts, after the second set time is received and the second set time is set in an internal timer, when a clock signal that is commonly used by the first unit and the second units is detected, a time measuring operation of the internal timer from the second set time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The disclosed technology is not limited to the embodiments. Furthermore, the embodiments described below can be appropriately used in combination as long as they do not conflict with each other.

[a] First Embodiment

Figure 1:
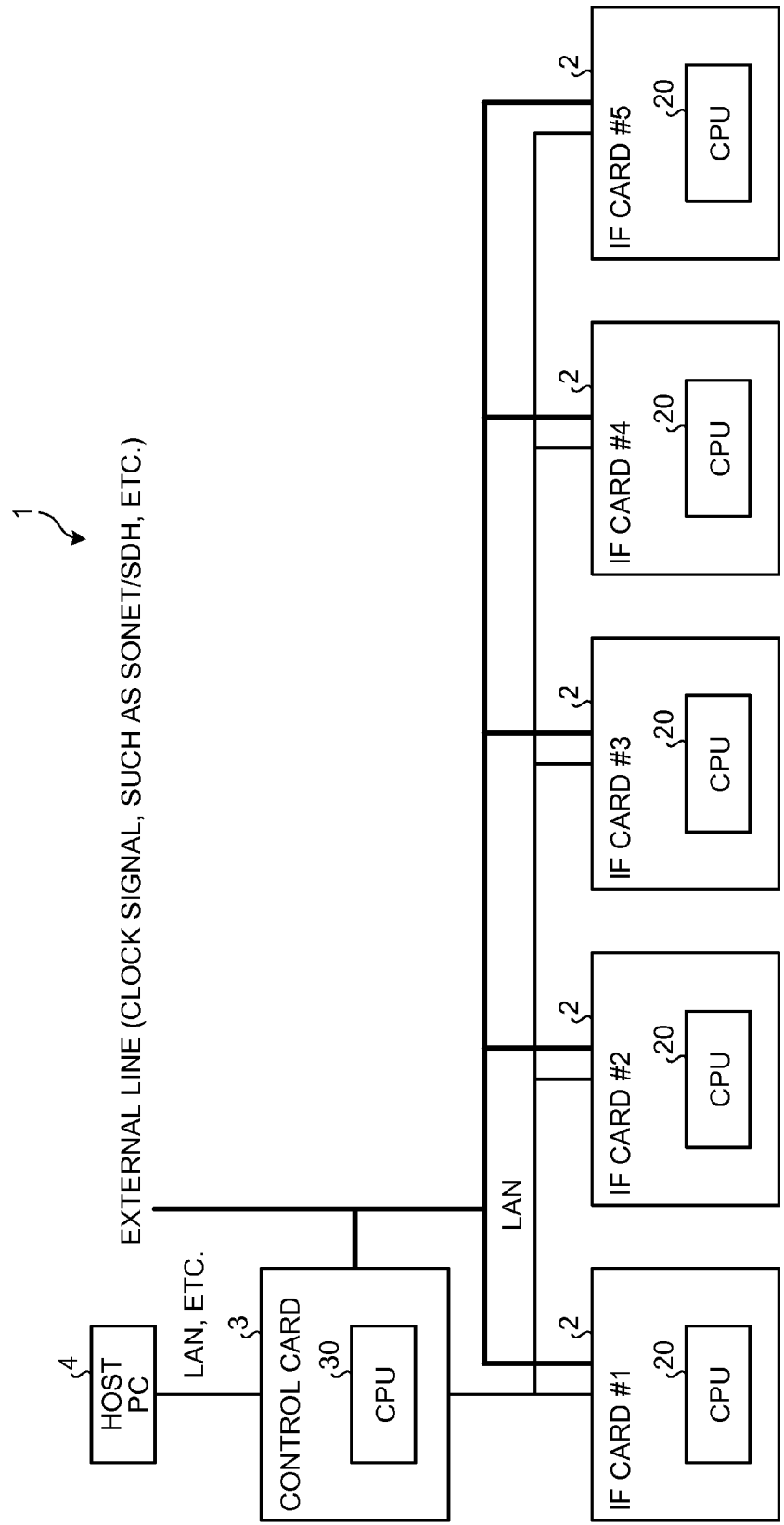
FIG. 1 is a schematic diagram illustrating an example of a transmission device according to a first embodiment.

FIG. 1 is a schematic diagram illustrating an example of a transmission device according to a first embodiment. A transmission device 1 illustrated in FIG. 1 is a transmission device that connects with a transmission network of, for example, synchronous optical network (SONET)/synchronous digital hierarchy (SDH). The transmission device 1 includes a plurality of IF cards 2 and a control card 3 that controls the plurality of IF cards 2. The transmission device 1 connects with, via a local area network (LAN), a host PC 4 that sets and controls the setting content or time information in the transmission device 1. The transmission device 1 has mounted thereon a plurality of, for example, five IF cards 2 indicated by #1 to #5. The IF cards 2 and the control card 3 in the transmission device 1 synchronize each other by using a clock signal that is in common in the transmission network. Furthermore, the clock signal corresponds to, for example, a clock signal with 64 kHz or 2 kHz that is periodically acquired from the SONET/SDH transmission network and ensures the synchronization among the control card 3 and the IF cards 2 in the transmission device 1. Furthermore, the control card 3 corresponds to, for example, a first unit and the IF cards 2 correspond to, for example, second units.

Figure 2:
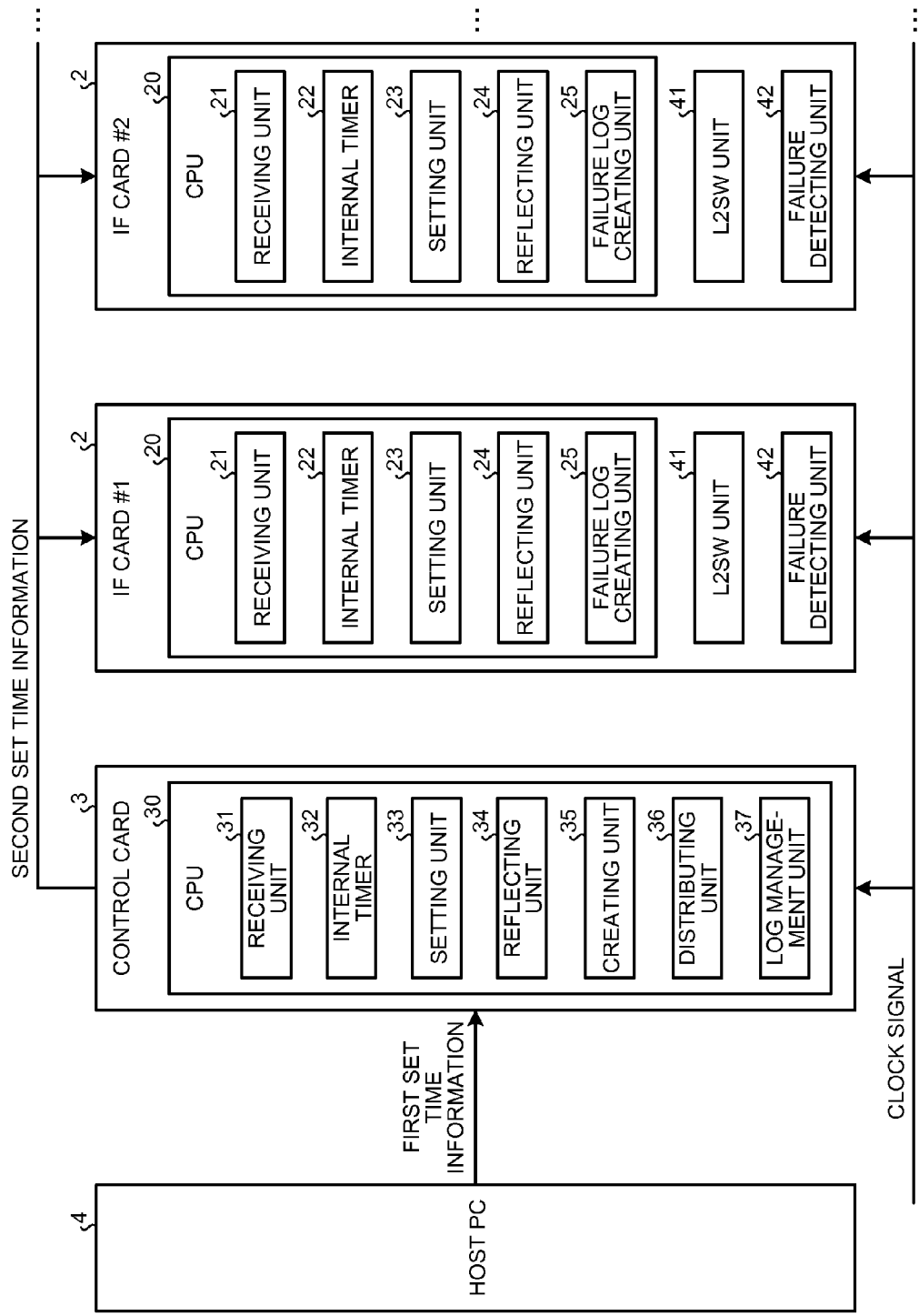
FIG. 2 is a block diagram illustrating an example of the configuration of each card.

FIG. 2 is a block diagram illustrating an example of the configuration of each card. The control card 3 includes a CPU 30 that controls the control card 3 itself. The CPU 30 includes a receiving unit 31, an internal timer 32, a setting unit 33, a reflecting unit 34, a creating unit 35, a distributing unit 36, and a log management unit 37. The receiving unit 31 receives first set time information received from the host PC 4. The internal timer 32 has a clock function that measures the time. The setting unit 33 sets, in the internal timer 32, first set time included in the first set time information received by the receiving unit 31. The reflecting unit 34 reflects the first set time that has been set in the internal timer 32, i.e., starts the time measuring operation of the internal timer 32 from the first set time.

The creating unit 35 calculates second set time by adding the add time that corresponds to one cycle of a clock signal to the received first set time. The add time corresponds to the time period for which all of the IF cards 2 in the transmission device 1 finish receiving second set time information from the control card 3 and is the time period of, for example, one cycle of a clock signal. This one cycle mentioned here corresponds to the time period from when a clock signal is output until when the immediately subsequent clock signal is output. The creating unit 35 calculates the second set time and creates the second set time information that includes therein the calculated second set time. The distributing unit 36 distributes the second set time information created by the creating unit 35 to each of the IF cards 2 by using multicast transmission. The log management unit 37 collects failure information received from each of the IF cards 2 and manages the failure information as a log. The failure information mentioned here is log information that includes therein the failure content and the failure occurrence time.

The IF card 2 includes, in addition to a CPU 20, an L2SW unit 41 and a failure detecting unit 42. The L2SW unit 41 is a switching unit that switches and connects communication paths. The failure detecting unit 42 detects a failure of the IF card 2 itself, a failure of a communication path, or the like. The CPU 20 controls the IF card 2 itself. The CPU 20 includes a receiving unit 21, an internal timer 22, a setting unit 23, a reflecting unit 24, and a failure log creating unit 25. The receiving unit 21 receives the second set time information distributed from the control card 3. The internal timer 22 has a clock function of measuring time. The setting unit 23 sets, in the internal timer 22, the second set time that is included in the second set time information received by the receiving unit 21. After the reflecting unit 24 sets the second set time in the internal timer 22, the reflecting unit 24 determines whether a clock signal has been detected. When a clock signal has been detected, the reflecting unit 24 starts the time measuring operation of the internal timer 22 from the second set time. When a failure is detected by the failure detecting unit 42, the failure log creating unit 25 creates failure information that includes therein the failure content and the failure occurrence time and notifies the control card 3 of the failure information. The failure log creating unit 25 acquires the failure occurrence time by using the measured time in the internal timer 22 at the time of failure detection.

Figure 3:
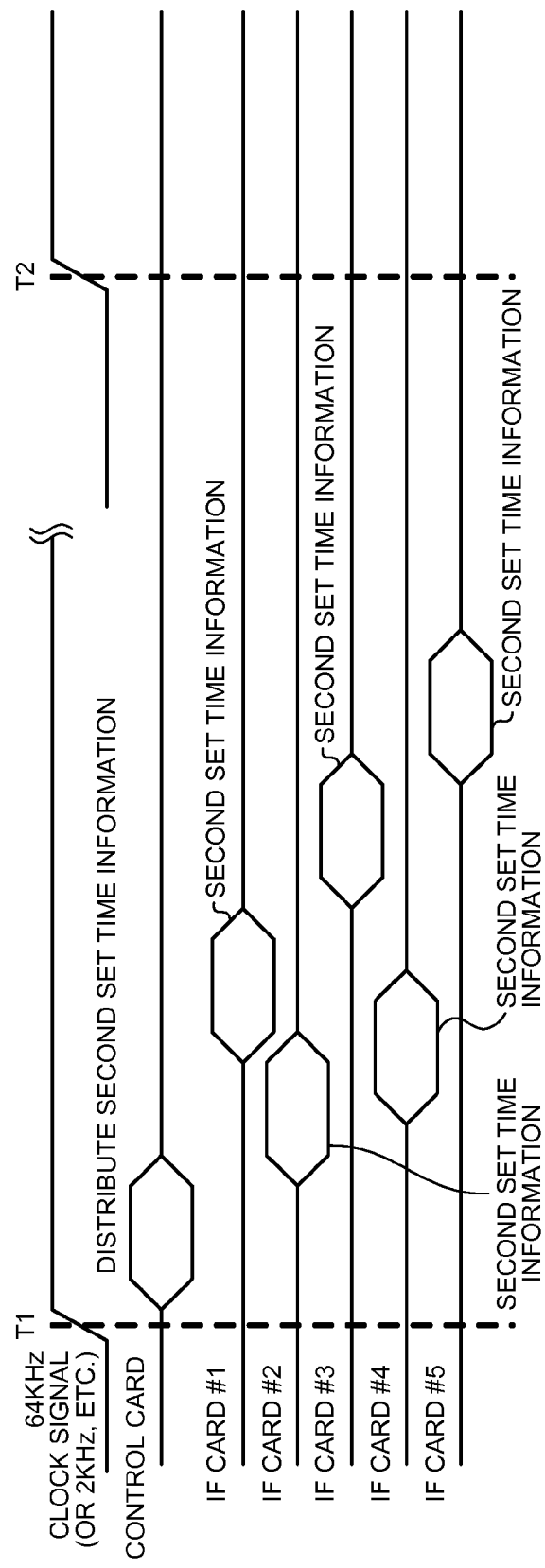
FIG. 3 is a timing chart illustrating an example of the operation timing of each card related to a time synchronization process.

FIG. 3 is a timing chart illustrating an example of the operation timing of each card related to a time synchronization process. After the second set time information that includes therein the second set time is created, the control card 3 distributes, at a timing T1 at which a clock signal has been detected, the second set time information to all of the IF cards 2 in the transmission device 1 by using multicast transmission.

Each of the IF cards 2 receives the second set time information distributed from the control card 3. The timing at which the second set time information is received differs in each of the IF cards 2 due to a transmission delay. After having received the second set time information, each of the IF cards 2 sets, in the internal timer 22, the second set time included in the second set time information. Furthermore, after having set the second set time in the internal timer 22, each of the IF cards 2 starts, at a timing T2 at which a clock signal has been detected, the time measuring operation of the internal timer 22 from the second set time. Namely, because each of the IF cards 2 starts, at the timing T2 at which the clock signal has been detected, the time measuring operation of the internal timer 22 from the second set time, synchronization of the measured time can be ensured.

Figure 4:
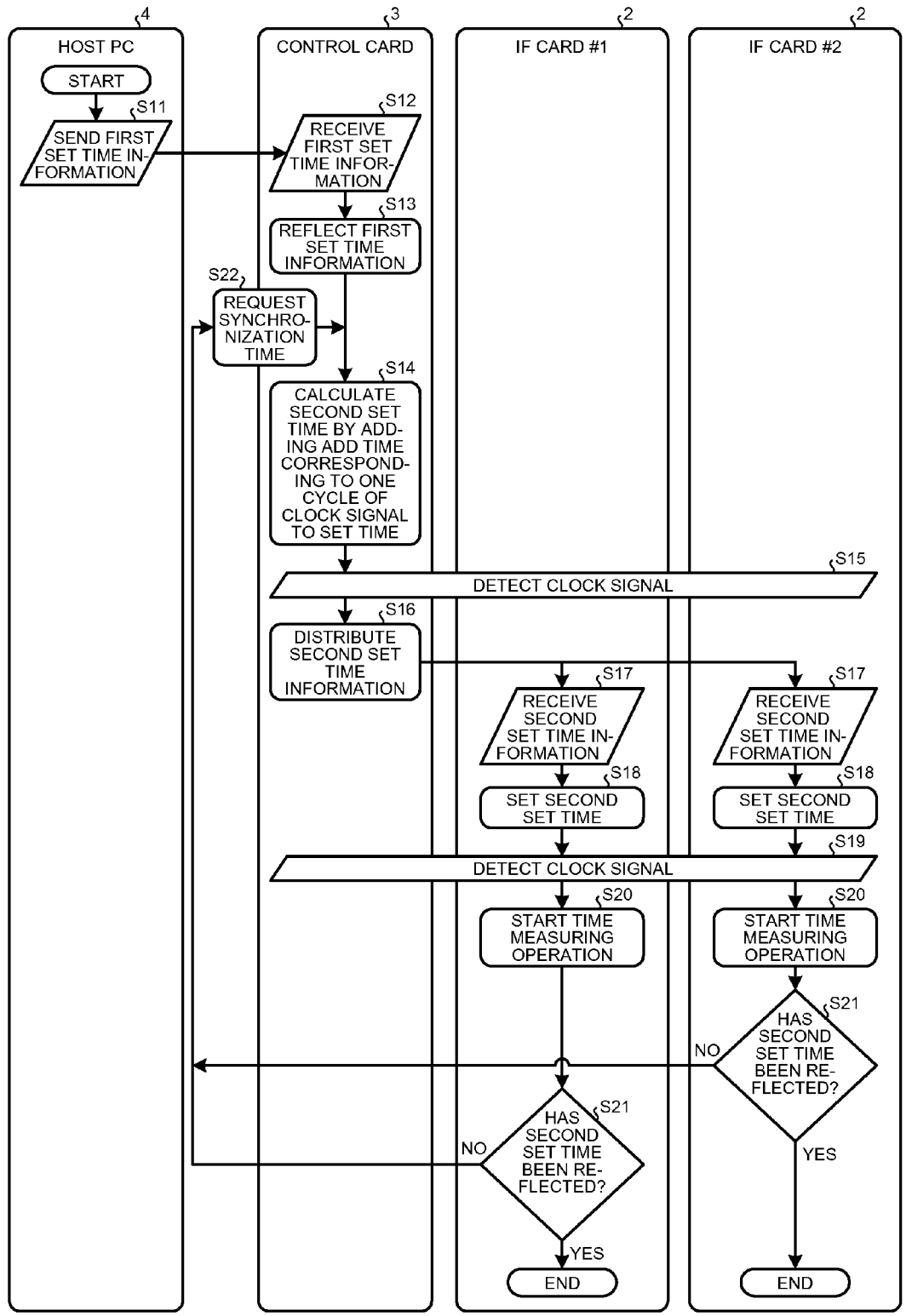
FIG. 4 is a flowchart illustrating an example of the operation of a process performed by each card related to the time synchronization process.

In the following, the operation of the transmission device 1 according to the first embodiment will be described. FIG. 4 is a flowchart illustrating an example of the operation of a process performed by each card related to the time synchronization process. In FIG. 4, the host PC 4 notifies the control card 3 of the first set time information that includes therein the first set time that is used to set the time in the transmission device 1 (Step S11). When the control card 3 receives the first set time information from the host PC 4 (Step S12), the control card 3 sets, in the internal timer 32, the first set time that is included in the first set time information and then starts the time measuring operation of the internal timer 32 from the first set time (Step S13).

Furthermore, the control card 3 calculates the second set time by adding the add time corresponding to one cycle of a clock signal to the first set time and creates the second set time information that includes therein the second set time (Step S14). After having created the second set time information, When the control card 3 detects a clock signal (Step S15), the control card 3 distributes the second set time information to each of the IF cards 2 in the transmission device 1 (Step S16).

Each of the IF cards 2 receives the second set time information distributed from the control card 3 (Step S17) and sets, in the internal timer 22, the second set time included in the second set time information (Step S18). After the second set time is set in the internal timer 22, when each of the IF cards 2 detects a clock signal (Step S19), each of the IF cards 2 starts the time measuring operation of the internal timer 22 from the second set time (Step S20). Then, each of the IF cards 2 starts the time measuring operation from the second set time, i.e., determines whether the second set time has been reflected in the internal timer 22 (Step S21). When each of the IF cards 2 reflects the second set time in the internal timer (Yes at Step S21), each of the IF cards 2 ends the operation of the process illustrated in FIG. 4.

In contrast, each of the IF cards 2 is not able to reflect the second set time in the internal timer 22 (No at Step S21), each of the IF cards 2 again requests a synchronization time request from the control card 3 (Step S22). The synchronization time request is a command that is used by the IF card 2 to request the control card 3 to re-calculate the second set time and distribute the second set time information that includes therein the second set time. When the control card 3 receives the synchronization time request from the IF card 2, the control card 3 proceeds to Step S14 in order to set the current measured time to the set time and calculate the second set time by adding the add time corresponding to one cycle of a clock signal to the subject set time.

Furthermore, when the failure log creating unit 25 in the CPU 20 in the IF card 2 detects a failure via the failure detecting unit 42, the failure log creating unit 25 determines that the measured time in the internal timer 22 is the failure occurrence time and then creates the failure occurrence time and the failure content as the failure information. The failure log creating unit 25 notifies the control card 3 of the failure information via the L2SW unit 41.

When the log management unit 37 in the CPU 30 in the control card 3 receives the failure information of each of the IF cards 2, the log management unit 37 manages, as a failure log, the failure content and the failure occurrence time that are included in the failure information. Furthermore, a maintenance terminal (not illustrated) accesses the log management unit 37 in the control card 3 and displays the failure log that is being managed by the log management unit 37 on a screen in time series on the basis of the failure occurrence time. Consequently, a user of the maintenance terminal can recognize the failure content and the failure occurrence time in the failure log that is being displayed on the screen.

The IF card 2 in the transmission device 1 according to the first embodiment described above receives the second set time information distributed from the control card 3 and sets, in the internal timer 22, the second set time included in the second set time information. Furthermore, after the IF card 2 sets the second set time in the internal timer 22, when the IF card 2 detects a clock signal, the IF card 2 starts the time measuring operation of the internal timer 22 from the second set time. Consequently, because each of the IF cards 2 in the transmission device 1 starts the time measuring operation from the second set time at the timing at which the same clock signal has been detected, synchronization of the measured time in the internal timer 22 can be ensured. Furthermore, the control card 3 starts the time measuring operation of the internal timer 32 from the first set time received from the host PC 4. Thus, it is possible to ensure the synchronization of the measured time of the control card 3 and the IF cards 2 in the transmission device 1.

Furthermore, when the IF card 2 detects a failure, the IF card 2 sets the measured time in the internal timer 22 as the failure occurrence time; creates failure information by associating the measured time with the failure content; and notifies the control card 3 of the failure information. Consequently, each of the IF cards 2 can report the accurate failure occurrence time to the control card 3.

Furthermore, the control card 3 collects failure information from each of the IF cards 2 and provides, in accordance with a request from a maintenance terminal, on the basis of the failure occurrence time included in the failure information, the maintenance terminal with the failure content in time series. Consequently, the user of the maintenance terminal can recognize the failure content and the failure occurrence time of each of the IF cards 2 and recognize the occurrence of failure in time series, whereby the efficiency of maintenance of failures is improved.

In the first embodiment described above, the second set time included in the second set time information received by the CPU 20 in the IF card 2 is extracted; the extracted second set time is set in the internal timer 22; and the operation of a reflecting process is performed in the CPU 20. However, the setting and the reflection of the internal timer 22 may also be performed by hardware and an embodiment of this case will be described below as a second embodiment.

[b] Second Embodiment

Figure 5:
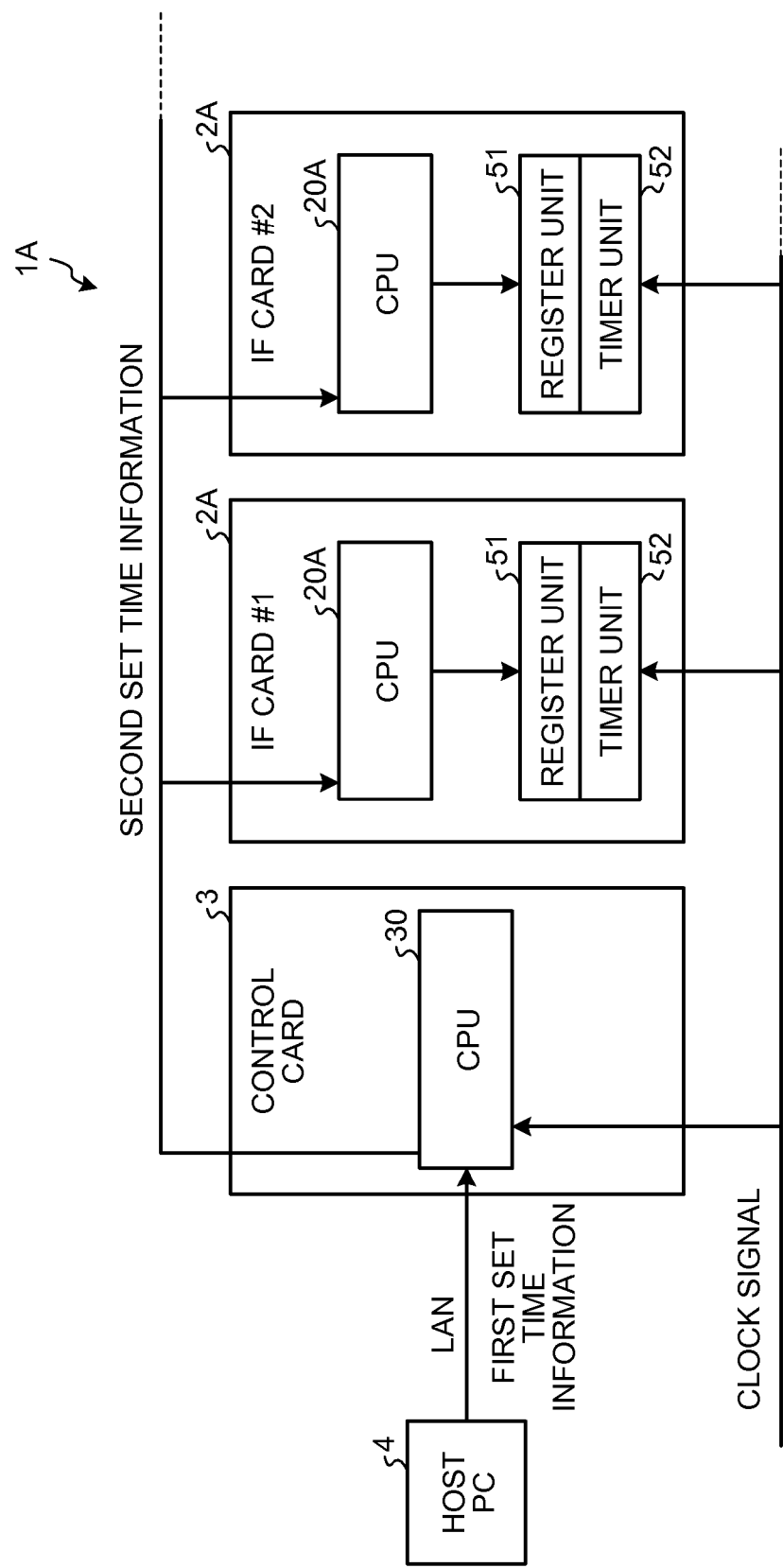
FIG. 5 is a block diagram illustrating an example of the configuration of each card in a transmission device according to a second embodiment.

FIG. 5 is a block diagram illustrating an example of the configuration of each card in a transmission device 1A according to a second embodiment. Components having the same configuration as those in the transmission device 1 according to the first embodiment are represented by the same reference numerals; therefore, descriptions of the configuration and the operation thereof will be omitted.

The transmission device 1A according to the second embodiment differs from the transmission device 1 according to the first embodiment in that, instead of the functional configuration of the internal timer 22, the setting unit 23, and the reflecting unit 24 in each of CPU 20A in corresponding IF card 2A, a register unit 51 and a timer unit 52 are provided as hardware configuration.

The receiving unit 21 in the CPU 20A in the IF card 2A receives the second set time information distributed from the control card 3 and registers, in the register unit 51, the second set time included in the second set time information.

After the second set time is registered in the register unit 51, when a clock signal is detected, the timer unit 52 starts the time measuring operation from the second set time registered in the register unit 51.

The IF card 2A according to the second embodiment receives the second set time information distributed from the control card 3 and registers, in the register unit 51, the second set time included in the second set time information. Furthermore, after the second set time has been registered in the register unit 51, the timer unit 52 in the IF card 2A starts the time measuring operation from the registered second set time. Consequently, in each of the IF cards 2A, synchronization of measured time can be ensured in a hardware process while the processing load of the CPUs 20A are reduced.

[c] Third Embodiment

Figure 6:
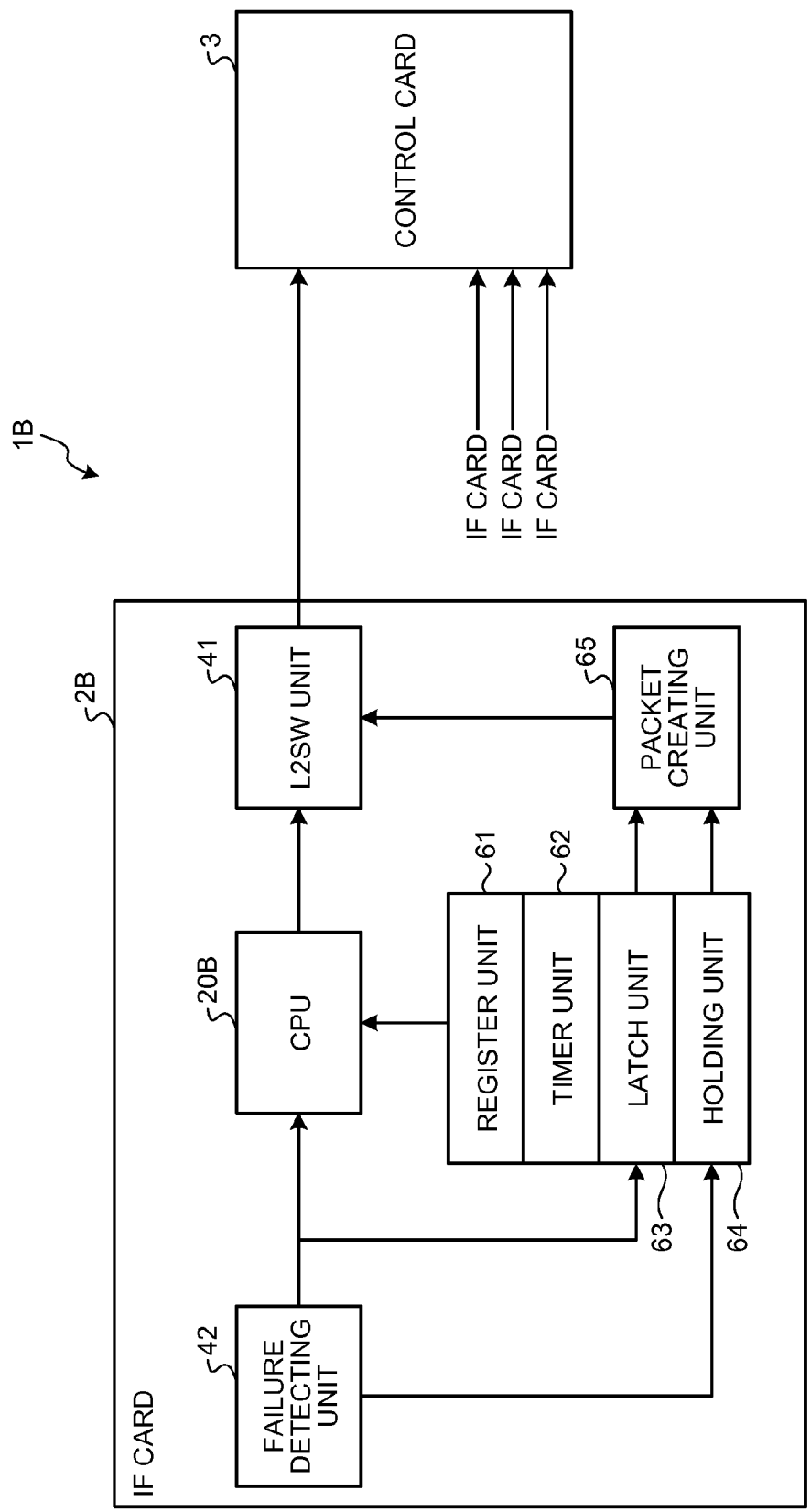
FIG. 6 is a block diagram illustrating an example of the configuration of an IF card in a transmission device according to a third embodiment.

FIG. 6 is a block diagram illustrating an example of the configuration of an IF card 2B in a transmission device 1B according to a third embodiment. Components having the same configuration as those in the transmission device 1 according to the first embodiment are represented by the same reference numerals; therefore, descriptions of the configuration and the operation thereof will be omitted.

The transmission device 1B according to the third embodiment differs from the transmission device 1 according to the first embodiment in that the functional configuration of the internal timer 22, the setting unit 23, the reflecting unit 24, and the failure log creating unit 25 in the CPU 20 in the IF card 2 are deleted. Instead of these, a register unit 61, a timer unit 62, a latch unit 63, a holding unit 64, and a packet creating unit 65 are provided as the hardware configuration.

The receiving unit 21 in a CPU 20B receives the second set time information distributed from the control card 3 and registers, in the register unit 61, the second set time included in the second set time information. After the second set time has been registered in the register unit 61, when a clock signal is detected, the timer unit 62 starts the time measuring operation of the set time registered in the register unit 61.

When the failure detecting unit 42 detects a failure, the failure detecting unit 42 holds the failure content in the holding unit 64. Furthermore, when the latch unit 63 detects a failure via the failure detecting unit 42, the latch unit 63 holds the measured time in the timer unit 62 as the failure occurrence time. Then, the packet creating unit 65 packetizes the failure information that includes therein the failure content that is being held by the holding unit 64 and failure occurrence time that is held by the latch unit 63. The L2SW unit 41 sends the failure information created by the packet creating unit 65 to the control card 3.

The IF card 2B according to the third embodiment described above receives the second set time information distributed from the control card 3 and registers, in the register unit 61, the second set time included in the second set time information. Furthermore, the timer unit 62 in the IF card 2B registers the second set time in the register unit 61 and then starts the time measuring operation from the registered second set time. Consequently, each of the IF cards 2B can ensure synchronization of the measured time by using a hardware process while reducing the processing load of the CPU 20B.

When the IF card 2B detects a failure, the IF card 2B holds the measured time of the timer unit 62 at the time of failure detection as the failure occurrence time of the latch unit 63; holds the failure content in the holding unit 64; and sends the failure occurrence time and the failure content as the failure information to the control card 3. Consequently, each of the IF cards 2B can report the own failure information to the control card 3 by using a hardware process while reducing the processing load of the CPU 20B.

As described above, in the first embodiment described above, the time synchronization process performed by the IF cards 2 mounted on the transmission device 1 is described as an example; however, for example, the time synchronization process is also similarly performed when the IF card 2 is newly mounted on the transmission device 1 or when a new card is added. An embodiment of this case will be described below as a fourth embodiment.

[d] Fourth Embodiment

Figure 7:
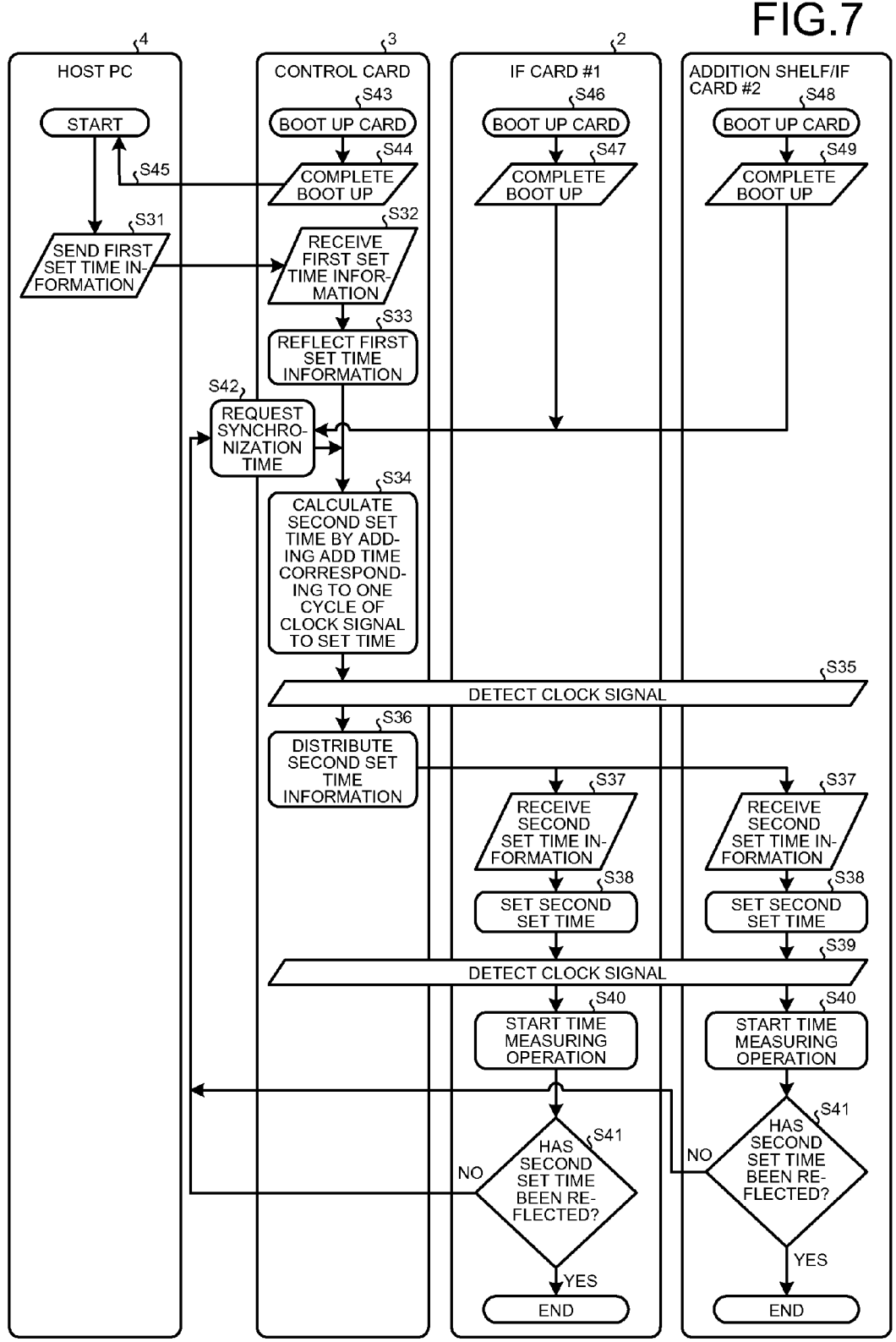
FIG. 7 is a flowchart illustrating an example of the operation of a process performed by each card related to a time synchronization process according to a fourth embodiment.
Figure 8:
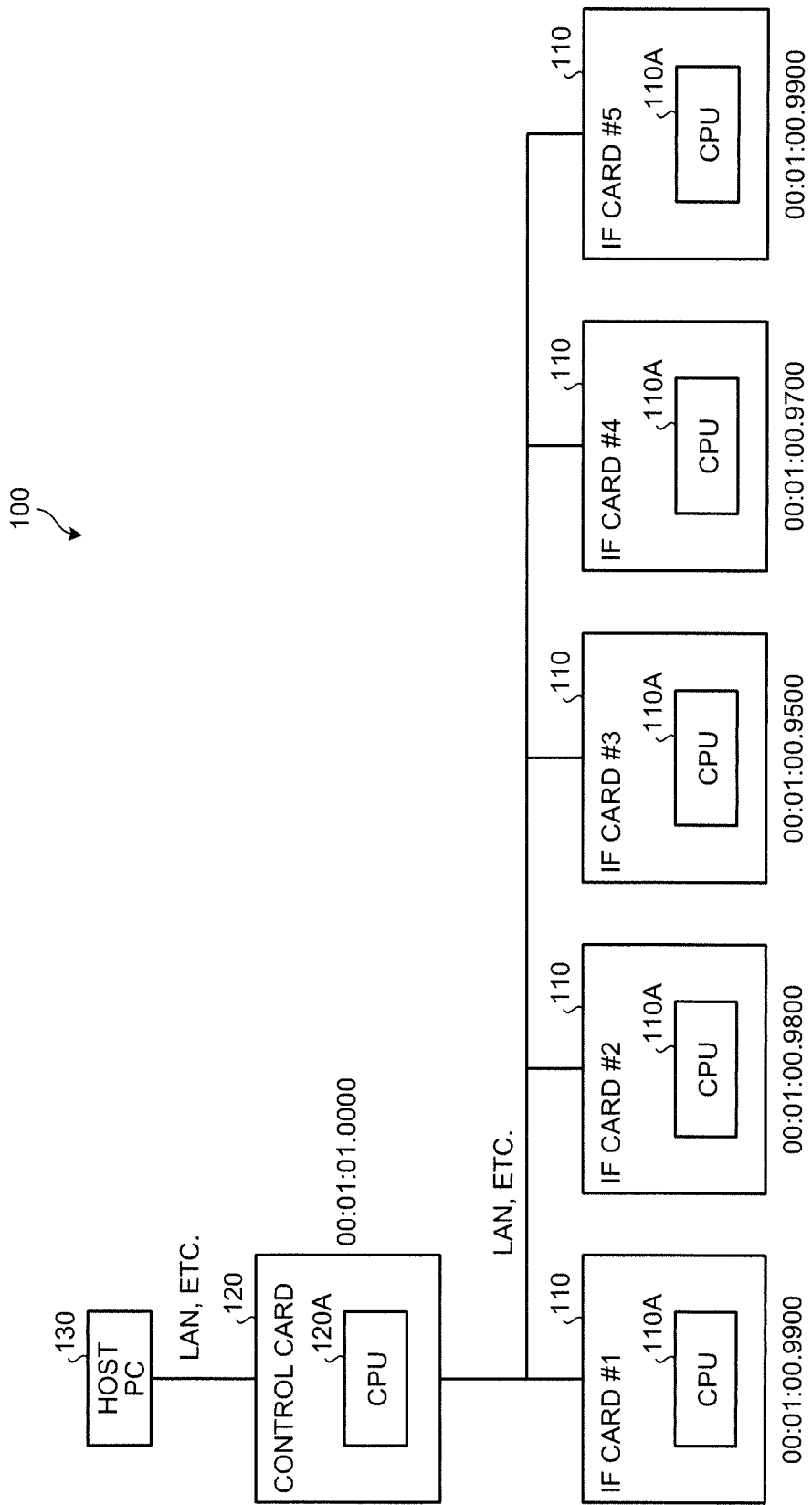
FIG. 8 is a diagram illustrating an example of a transmission device.
Figure 9:
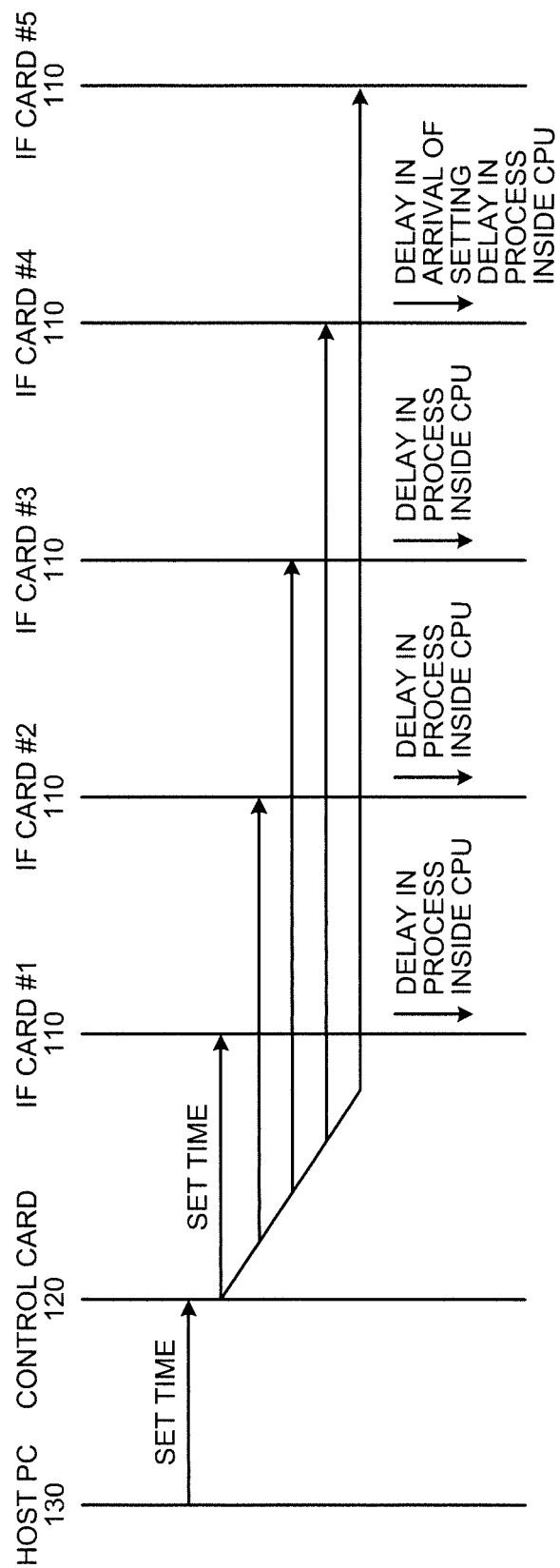
FIG. 9 is a diagram illustrating an example of a delay of a process performed by each IF card in the transmission device.

FIG. 7 is a flowchart illustrating an example of the operation of a process performed by each card in the transmission device 1 related to a time synchronization process according to a fourth embodiment. Components having the same configuration as those in the transmission device 1 according to the first embodiment are represented by the same reference numerals; therefore, descriptions of the configuration and the operation thereof will be omitted. In FIG. 7, the host PC 4 sets the first set time in which a clock in the transmission device 1 is set and notifies the control card 3 of the first set time information that includes therein the set first set time (Step S31). When the control card 3 receives the first set time information from the host PC 4 (Step S32), the control card 3 sets, in the internal timer 32, the first set time included in the first set time information and then reflects the internal timer 32 (Step S33).

Furthermore, the control card 3 calculates the second set time by adding the add time corresponding to one cycle of the clock signal to the first set time and creates the second set time information that includes therein the second set time (Step S34). After having created the second set time information, when the control card 3 detects a clock signal (Step S35), the control card 3 distributes the second set time information to each of the IF cards 2 in the transmission device 1 (Step S36).

Each of the IF cards 2 receives the second set time information distributed from the control card 3 (Step S37) and sets, in the internal timer 22, the second set time included in the second set time information (Step S38). After having set the second set time in the internal timer 22, when each of the IF cards 2 detects a clock signal (Step S39), each of the IF cards 2 starts the time measuring operation of the internal timer 22 from the second set time (Step S40). Then, each of the IF cards 2 starts the time measuring operation from the second set time, i.e., determines whether the second set time has been reflected in the internal timer 22 (Step S41). When each of the IF cards 2 has reflected the second set time in the internal timer 22 (Yes at Step S41), each of the IF cards 2 ends the operation of the process illustrated in FIG. 7. In contrast, when each of the IF cards 2 is not able to reflect the second set time into the internal timer 22 (No at Step S41), each of the IF cards 2 again sends a synchronization time request to the control card 3 (Step S42). When the control card 3 receives the synchronization time request sent from the IF card 2, the control card 3 proceeds to Step S34 in order to set the current measured time as the set time and calculate the second set time by adding the add time corresponding to one cycle of the clock signal to the set time.

For example, it is assumed that the control card 3 is mounted on the transmission device 1. The mounted control card 3 starts booting up its operation (Step S43) and, when the boot has been completed (Step S44), the control card 3 requests the first set time information from the host PC 4 (Step S45). Then, the host PC 4 proceeds to Step S31 in order to send, in accordance with the request for the first set time information performed at Step S45, the first set time information that includes therein the first set time to the control card 3.

Furthermore, it is assumed that the IF card 2 is mounted on the transmission device 1. The mounted IF card 2 starts booting up its operation (Step S46) and, when the boot has been completed (Step S47), the IF card 2 proceeds to Step S42 in order to send a synchronization time request to the control card 3.

Furthermore, it is assumed that an additional shelf, such as the IF card 2, is mounted on the transmission device 1. The IF card 2 in the additional shelf starts booting up its operation (Step S48) and, when the boot has been completed (Step S49), the IF card 2 proceeds to Step S42 in order to send a synchronization time request to the control card 3.

With the transmission device 1 according to the fourth embodiment, when the control card 3 is mounted, when a boot up of the control card 3 is started and then completed, the transmission device 1 requests the first set time information that includes therein the first set time from the host PC 4. Consequently, time synchronization in the transmission device 1 can be implemented at the timing at which the control card 3 is mounted.

When the IF card 2 is mounted, when a boot up of the IF card 2 is started and then completed, the transmission device 1 requests the second set time information that includes therein the second set time from the control card 3. Consequently, time synchronization in the transmission device 1 can be implemented at the timing at which the IF card 2 is mounted.

When the IF card 2 is mounted on an additional shelf, when a boot up of the IF card 2 is started and then completed, the transmission device 1 requests the second set time information that includes therein the second set time from the control card 3. Consequently, time synchronization in the transmission device 1 can be implemented at the timing at which the additional shelf is mounted.

Furthermore, in the embodiments described above, the second set time information that includes therein the second set time is distributed from the control card 3 to the IF cards 2 in the transmission device 1 by using multicast transmission; however, broadcast may also be used for the distribution.

Furthermore, in the embodiments described above, the second set time information that includes therein the second set time is distributed from the control card 3 to the IF cards 2 in the transmission device 1. However, it may also be possible to create, from among the plurality of the IF cards 2, the second set time information that includes therein the second set time by using the single IF card 2 and distribute the second set time information to the control card 3, not to mention, the other IF cards 2.

Furthermore, for the transmission device 1 according to the embodiments described above, the transmission device connected to the transmission network that uses the SONET/SDH synchronization method is used as an example, in which, when a clock signal using SONET/SDH is detected, the time measuring operation of the internal timer 22 is started from the second set time. However, the transmission device 1 is not limited to the transmission network that uses the synchronization method but can also be used for a transmission device connected to a transmission network that uses an asynchronous method. In this case, because no clock signal commonly used in the control card 3 and the IF cards 2 in the transmission device 1 is present, a common clock signal is individually provided in the control card 3 and the IF cards 2.

In the embodiments described above, the time period corresponding to one cycle of the clock signal is used as an example of the add time for calculating the second set time; however, the add time is not limited to one cycle. For example, the time period may also be equal to or less than one cycle, not to mention one cycle. Namely, the add time may also be the time period for which all of the IF cards 2 in the transmission device 1 can sufficiently receive the second set time information from the control card 3.

In the embodiments described above, the add time that is used to calculate the second set time is set to one cycle of the clock signal, and, after each of the IF cards 2 sets the second set time in the internal timer 22, when the immediately subsequent clock signal is detected, the time measuring operation of the internal timer 22 is started from the second set time. However, for example, the add time may also be set to two cycles of the clock signal, and, after the second set time is set in the internal timer 22, when, instead of the immediately subsequent clock signal, a clock signal that appears in the second cycle and that is subsequent to the immediately subsequent clock signal is detected, the time measuring operation of the internal timer 22 may also be started. Namely, after the add time is set to cycles with a predetermined number of times and the second set time is set in the internal timer 22, when clock signals with the predetermined number of times are detected, the time measuring operation of the internal timer 22 may also be started from the second set time that is being set.

In the embodiments described above, from among the plurality of IF cards 2, when one of the IF card 2 is not able to set the second set time in the internal timer 22 before a synchronization signal is detected, recalculation of the second set time and creation of the second set time information are again requested to the control card 3. Then, the synchronization process for the set time is performed on all of the IF cards 2 in the transmission device 1. However, the second set time information may also be requested again only to the IF card 2 that was not able to start the time measuring operation of the second set time in the internal timer 22.

After having started the time measuring operation of the internal timer 32 from the first set time, the control card 3 according to the embodiments described above calculates the second set time by adding the add time corresponding to one cycle of the clock signal to the first set time. However, the control card 3 may also calculate the second set time after having started the time measuring operation of the internal timer 32 from the first set time and the clock signal has been detected.

With the transmission device 1 according to the embodiments described above, a case in which a single control card 3 is mounted as an example; however, the control card 3 may also be configured as a redundant configuration. In such a case, in the redundant configuration, the second set time information that includes therein the second set time distributed from one of the control cards 3 may also be created and the created second set time information may also be distributed to each of the IF cards 2 and the other one of the control cards 3 in the transmission device 1.

In the embodiments described above, synchronization of the measured time among the cards in the transmission device 1 is ensured; however, the target for the synchronization is not limited to the cards in the transmission device 1. It may also be possible to ensure synchronization of measured time among the units in the system.

In the embodiments described above, synchronization of the measured time among the cards is performed by wired connections in the transmission device 1; however, it may also be possible to ensure synchronization of measured time among the cards by wireless connections in the device.

Furthermore, the components of each unit illustrated in the drawings are not always physically configured as illustrated in the drawings. In other words, the specific shape of a separate or integrated unit is not limited to the drawings; however, all or part of the unit can be configured by functionally or physically separating or integrating any of the units depending on various loads or use conditions.

Furthermore, all or any part of the processing functions performed by each unit may also be executed by a central processing unit (CPU) (or a microcomputer, such as a micro processing unit (MPU) or a micro controller unit (MCU)). Furthermore, all or any part of the processing functions may also be executed by programs analyzed and executed by the CPU (or the microcomputer, such as the MPU or the MCU) or executed by hardware by wired logic.

Synchronization of accurate time can be ensured.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission device comprising:
   a first unit; and
   a plurality of second units,
   wherein the first unit includes a first processor configured to:
      create second set time after a predetermined time has elapsed from first set time, and
      distribute the created second set time to each of the second units, when detecting a boot up of one of the second units and each of the second units includes a second processor configured to
      start, after the second set time is received and the second set time is set in an internal timer, when a clock signal that is commonly used by the first unit and the second units is detected, a time measuring operation of the internal timer from the second set time.

2. The transmission device according to claim 1, wherein the predetermined time is a time period for which all of the second units are possible to receive the second set time from the first unit.

3. The transmission device according to claim 1, wherein the predetermined time is a time period corresponding to a predetermined number of cycles of the clock signal.

4. A time synchronization method performed in a transmission device that includes a first unit and a plurality of second units, the time synchronization method comprising:
   creating, by a first processor of the first unit, second set time after a predetermined time has elapsed from first set time;
   distributing, by the first processor, the created second set time to each of the second units, when detecting a boot up of one of the second units; and
   starting, by a second processor of each of the second units, after the second set time is received and the second set time is set in an internal timer, when a clock signal that is commonly used by the first unit and the second units is detected, a time measuring operation of the internal timer from the second set time.

* * * * *